US012795365B2

(12) United States Patent
Jeong

(10) Patent No.: US 12,795,365 B2
(45) Date of Patent: Nov. 10, 2026

(54) WI-FI PASSWORD SETTING METHOD FOR EACH REGISTERED USER AND SYSTEM FOR THE SAME

(71) Applicants: Hyundai Motor Company, Seoul (KR); Kia Corporation, Seoul (KR)

(72) Inventor: Dong Hyuk Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/818,099

(22) Filed: Aug. 28, 2024

(65) Prior Publication Data

US 2025/0126472 A1 Apr. 17, 2025

(30) Foreign Application Priority Data

Oct. 11, 2023 (KR) ........................ 10-2023-0134975

(51) Int. Cl.
*H04W 12/08* (2021.01)
*H04L 9/40* (2022.01)

(52) U.S. Cl.
CPC ........... *H04W 12/08* (2013.01); *H04L 63/102* (2013.01)

(58) Field of Classification Search
CPC ............. H04L 63/06-068; H04L 63/08; H04L 63/083-0846; H04L 63/0876; H04L 63/10-108; H04L 63/20-205; H04W 12/04-0471; H04W 12/06-069; H04W 12/08; H04W 12/50-55; H04W 48/08-16; H04W 88/08; H04W 88/10
See application file for complete search history.

(56) References Cited

U.S. PATENT DOCUMENTS

2014/0270243 A1* 9/2014 Bennett .................. A61B 5/742 381/86
2015/0199855 A1* 7/2015 Alam ...................... H04W 4/40 455/411

* cited by examiner

*Primary Examiner* — Kevin Bechtel
(74) *Attorney, Agent, or Firm* — Slater Matsil, LLP

(57) ABSTRACT

An embodiment method of setting a password for a Wi-Fi connection to a smartphone in a vehicle includes acquiring personal information of an occupant of the vehicle based on a digital key that has been used to access the vehicle, checking a preset Wi-Fi password based on the personal information, and changing and setting a Wi-Fi password in the vehicle to the preset Wi-Fi password.

20 Claims, 2 Drawing Sheets

WI-FI PASSWORD SETTING METHOD FOR EACH REGISTERED USER AND SYSTEM FOR THE SAME

CROSS-REFERENCE TO RELATED APPLICATIONS

This application claims the benefit of Korean Patent Application No. 10-2023-0134975, filed on Oct. 11, 2023, which application is hereby incorporated herein by reference as if fully set forth herein.

TECHNICAL FIELD

The present disclosure relates to a Wi-Fi password setting method for each registered user and a system for the Wi-Fi password setting method.

BACKGROUND

In general, a vehicle driving recording device is installed mainly to store records of accidents occurring while a vehicle is driving or while the vehicle is parked/stopped, but a playing function may be inconvenient or inadequate to use, compared to a recording function, because playing a video (or images) may require the use of a built-in liquid-crystal display (LCD) or the connection or transfer of a video recorded in a storage medium to a personal computer (PC).

In addition, because it also requires the arrangement of playing-related components including an LCD in an existing vehicle, an LCD-embedded vehicle driving recording device may be relatively expensive but have an image resolution that is not that high, failing to provide desirable image quality.

In addition, in the case of a vehicle driving recording device without a separate embedded video display device, there may be inconvenience in having to separate a storage medium and connect it to a PC to play a video, and during this process, when the storage medium is not properly connected to the vehicle driving recording device due to a user's mistake and the like, recording may not be performed while the vehicle is driving.

These disadvantages may be mistaken for the quality of a vehicle driving recording device, which may degrade the trust of customers. Furthermore, most mobile communication companies may provide data communication only with some charge through a 5G network but provide data communication for free through a Wi-Fi network, and smartphones may install and use separate programs or applications (or apps) and may be designed to support high-resolution displays. Thus, there is a need to utilize this fact actively.

Particularly, there is a need to use a smartphone as a video play device of the vehicle driving recording device while actively using a Wi-Fi network by installing an access point (AP) in the vehicle driving recording device, in an environment where using Wi-Fi is difficult because there is no AP installed inside the vehicle.

Accordingly, recently provided is a vehicle driving recording device or technology in which an AP function through Wi-Fi communication between the vehicle driving recording device and a smartphone is added to have a Wi-Fi function that allows the smartphone to access the vehicle driving recording device to play a video in real time, play a stored list or stored video, or change settings.

However, vehicles that have been gradually digitalized may require at least 30 to more than 100 electronic control units (ECUs) and, as communication between the ECUs and communication with the outside have also increased accordingly, the number of hacker attacks has also increased drastically.

Therefore, apart from the communication inside a vehicle via a controller area network (CAN) bus for the connection between the ECUs, the communication with the outside requires a considerable level of security, and it is therefore natural to set a password (or PW) for the Wi-Fi connection.

In addition, for a car-sharing vehicle or a vehicle used by multiple drivers, setting a Wi-Fi password may be performed such that each driver uses a different password to maintain a level of security. However, in practice, it may be inconvenient to change a Wi-Fi password set by a previous driver to a password to be used by a current driver each time a driver enters a vehicle, and such an inconvenience may be contrary to the purpose of the Wi-Fi connection function provided for user convenience.

SUMMARY

An embodiment of the present disclosure may solve issues existing in the art.

An embodiment of the present disclosure provides a registered user-specific Wi-Fi password setting method and system that, when an occupant gets into a vehicle with a digital key to which a personalization function is applied to identify an occupant, does not need to reset a Wi-Fi password each time an occupant changes, thereby increasing user convenience while maintaining the Wi-Fi access security.

According to an embodiment of the present disclosure, there is provided a method of setting a password for a Wi-Fi connection to a smartphone in a vehicle, the method comprising acquiring personal information of an occupant of the vehicle based on a digital key, in response to the digital key being used to access the vehicle, checking a preset Wi-Fi password based on the personal information, and changing and setting a Wi-Fi password in the vehicle to the preset Wi-Fi password.

In an embodiment, the digital key comprises a smartphone key or a near-field communication (NFC) card key.

In an embodiment, in response to the digital key being a digital key that has not been used before, the personal information of the occupant is newly registered and stored with the corresponding digital key.

In an embodiment, the personal information comprises authentication information.

In an embodiment, the registered user-specific Wi-Fi password setting method may further include, in the absence of the preset Wi-Fi password during the checking, setting a Wi-Fi password by the occupant through a user interface (UI).

In an embodiment, the registered user-specific Wi-Fi password setting method may further include establishing a Wi-Fi connection to a smartphone of the occupant through the set Wi-Fi password.

In an embodiment, the registered user-specific Wi-Fi password setting method may further include performing control on a video recording device in response to a request input through the smartphone of the occupant on which the Wi-Fi connection is established.

In an embodiment, the registered user-specific Wi-Fi password setting method may further include performing a Wi-Fi tethering function in the vehicle using the Wi-Fi password set during the changing and setting.

According to an embodiment of the present disclosure, there is provided a registered user-specific Wi-Fi password setting system comprising at least one digital key for unlocking doors and starting a vehicle, a body domain controller (BDC) configured to acquire and store user authentication and personal information of the digital key, a video recording device configured to store or display images acquired by a camera monitoring around the vehicle, and a Wi-Fi management module configured to perform Wi-Fi communication with a Wi-Fi terminal present within a predetermined distance based on the personal information stored in the BDC and manage a password for a Wi-Fi connection, wherein the Wi-Fi management module is configured to acquire personal information of an occupant of the vehicle using the digital key through the BDC, check a preset Wi-Fi password based on the personal information, and change and set a Wi-Fi password in the vehicle to the preset Wi-Fi password.

In an embodiment, the digital key comprises a smartphone key or a NFC card key.

In an embodiment, in response to the digital key being a digital key that has not been used before, the personal information of the occupant is newly registered and stored with the corresponding digital key.

In an embodiment, the personal information comprises authentication information.

In an embodiment, the Wi-Fi management module may be configured to, in the absence of the preset Wi-Fi password, allow the occupant to set a Wi-Fi password through a UI.

In an embodiment, the Wi-Fi management module may be configured to establish a Wi-Fi connection to a smartphone of the occupant through the set Wi-Fi password.

In an embodiment, the Wi-Fi management module may be configured to perform control on the video recording device in response to a request input through the smartphone of the occupant on which the Wi-Fi connection is established.

In an embodiment, the Wi-Fi management module may be configured to perform a Wi-Fi tethering function in the vehicle using the set Wi-Fi password.

According to embodiments of the present disclosure described herein, a registered user-specific Wi-Fi password setting method and system may vary a Wi-Fi password for accessing a video recording device for occupants identified by personalization in car-sharing and the like, may improve convenience without a need to reset the Wi-Fi password each time a user changes, and may additionally provide convenience in use when an in-vehicle Wi-Fi tethering function (e.g., a vehicle acting as an AP in an audio video navigation (AVN) system or the like) is used.

DETAILED DESCRIPTION OF ILLUSTRATIVE EMBODIMENTS

Figure 1:
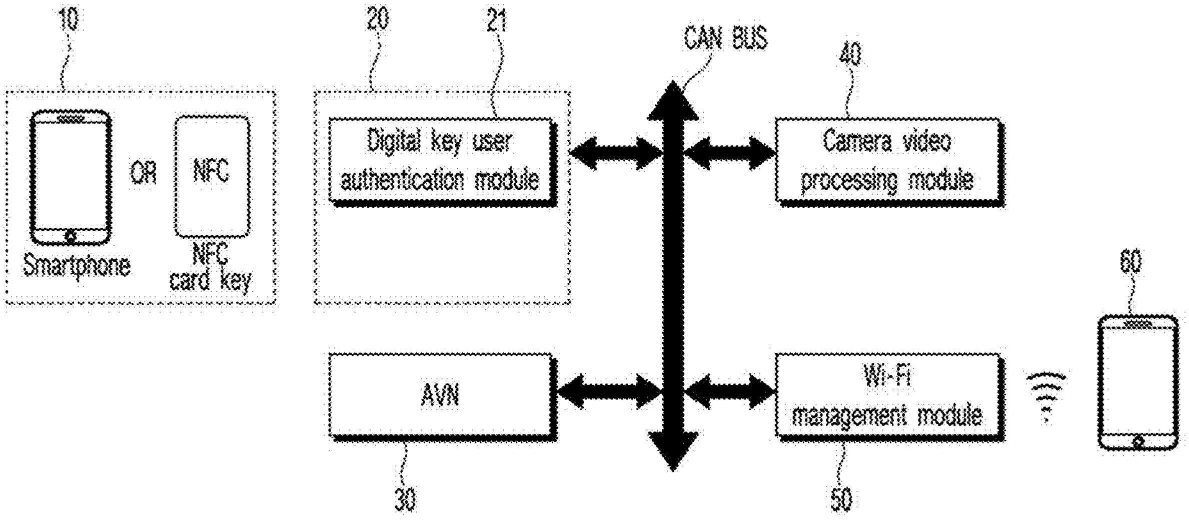
FIG. 1 is a block diagram illustrating an example system to which a registered user-specific Wi-Fi password setting method is applied according to an embodiment of the present disclosure.

Hereinafter, embodiments of the present disclosure will be described in detail with reference to the accompanying drawings. The embodiments are not construed as limited to the disclosure and should be understood to include all changes, equivalents, and replacements within the idea and the technical scope of the disclosure.

The terms "module," "unit," and/or "-er/or" for referring to elements are assigned and used interchangeably in consideration of the convenience of description, and thus the terms per se do not necessarily have different meanings or functions. The terms "module," "unit," and/or "-er/or" do not necessarily require physical separation.

Although terms including ordinal numbers, such as "first," " "second," and the like, may be used herein to describe various elements, the elements are not limited by these terms. These terms are only used to distinguish one element from another.

The term "and/or" is used to include any combination of multiple items that are subject to it. For example, "A and/or B" may include all three cases, for example, "A," "B," and "A and B."

When an element is described as "coupled" or "connected" to another element, the element may be directly coupled or connected to the other element. However, it is to be understood that another element may be present therebetween. In contrast, when an element is described as "directly coupled" or "directly connected" to another element, it is to be understood that there are no other elements therebetween.

The singular forms "a," "an," and "the" are intended to include the plural forms as well, unless the context clearly indicates otherwise. It is to be further understood that the terms "comprises/comprising" and/or "includes/including" used herein specify the presence of stated features, integers, steps, operations, elements, and/or components, but they do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the present disclosure, and they are not to be interpreted in an idealized or overly formal sense unless expressly so defined herein.

In addition, the term "unit" or "control unit" is merely a widely used term for naming a controller that controls a specific vehicle function, and it does not mean a generic functional unit. For example, each controller may include a communication device that communicates with another controller or a sensor to control a function assigned thereto, a memory that stores an operating system (OS), a logic command, input/output information, and the like, and one or more processors that perform determinations, calculations, decisions, and the like that are necessary for controlling a function assigned thereto.

Meanwhile, a processor may include a semiconductor integrated circuit and/or electronic devices that perform at least one or more of comparisons, determinations, computations, operations, and decisions to achieve programmed functions. The processor may be, for example, any one or a combination of a computer, a microprocessor, a central processing unit (CPU), an application-specific integrated circuit (ASIC), and an electronic circuit (e.g., circuitry and logic circuits).

In addition, computer-readable recording media (or simply memory) include all types of storage devices that store data readable by a computer system. The storage devices may include at least one type of, for example, flash memory, hard disk, micro-type memory, card-type (e.g., secure digital (SD) card or extreme digital (XD) card) memory, random-access memory (RAM), static RAM (SRAM), read-only memory (ROM), programmable ROM (PROM), electrically erasable PROM (EEPROM), magnetic RAM (MRAM), magnetic disk, or optical disc.

This recording medium may be electrically connected to the processor, and the processor may load and record data from the recording medium. The recording medium and the processor may be integrated or may be physically separated.

Hereinafter, a method of setting a Wi-Fi password for each registered user (also simply referred to herein as a "registered user-specific Wi-Fi password setting method") and a system therefor will be described in detail with reference to the accompanying drawings.

Figure 2:
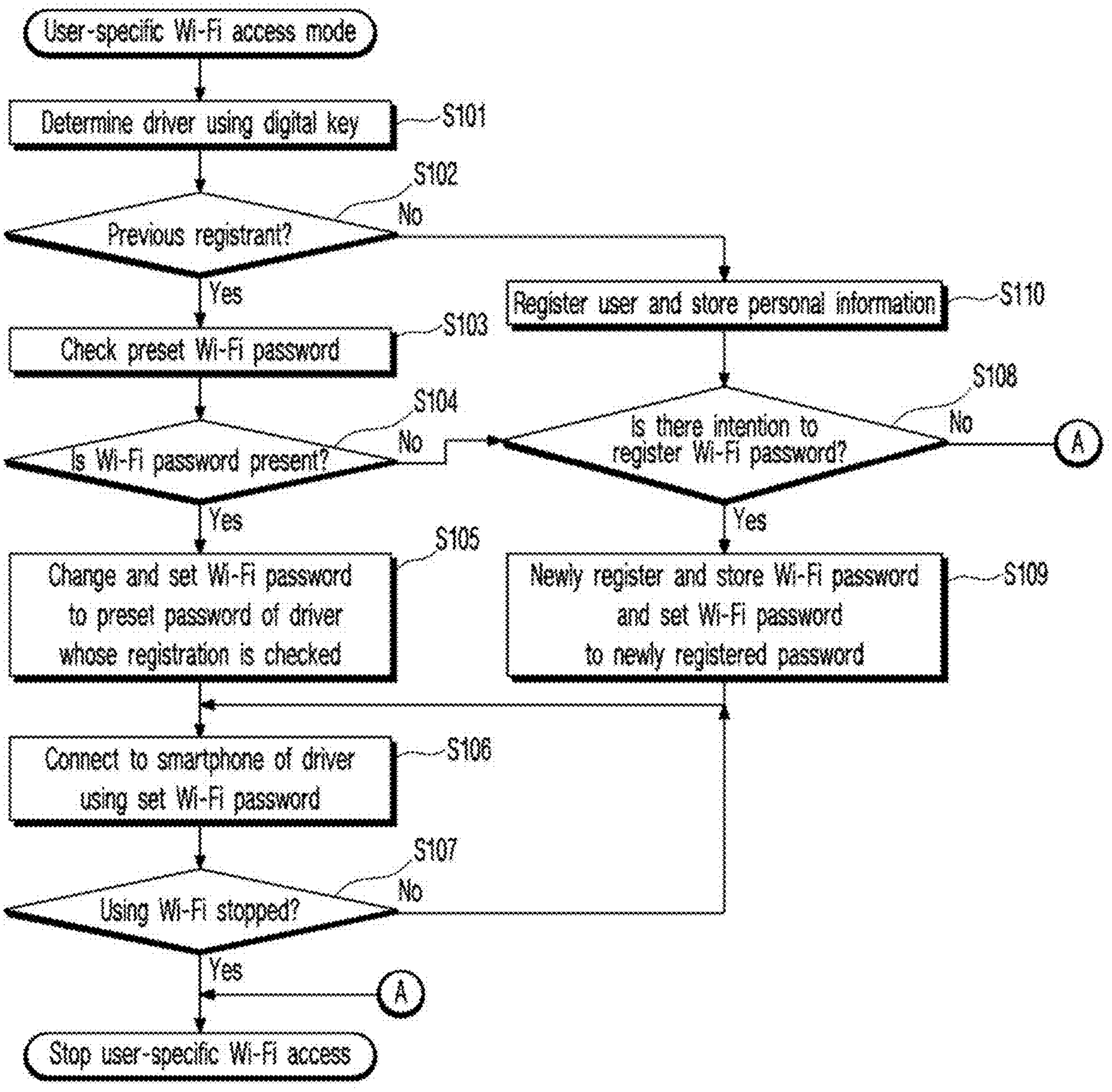
FIG. 2 is a flowchart illustrating an example process of setting a Wi-Fi password for each registered user according to an embodiment of the present disclosure.

FIG. 1 is a block diagram illustrating an example system to which a registered user-specific Wi-Fi password setting method is applied according to an embodiment of the present disclosure, and FIG. 2 is a flowchart illustrating an example registered user-specific Wi-Fi password setting method according to an embodiment of the present disclosure.

As shown in FIG. 1, a system for setting a Wi-Fi password for each registered user, or hereinafter referred to simply as a "registered user-specific Wi-Fi password setting system," may include a digital key 10 configured as a smartphone key or a near-field communication (NFC) card key, a body domain controller (BDC) 20 including a digital key user authentication module 21, a camera video processing module 40 configured to process images acquired by a camera (not shown) observing the inside and outside of a vehicle, an audio video navigation (AVN) system 30 configured to store or display images acquired through the camera video processing module 40, and a Wi-Fi management module 50 connected to the BDC 20, the camera video processing module 40, and the AVN system 30 via a controller area network (CAN) bus and configured to perform Wi-Fi communication with a Wi-Fi terminal 60 present within a predetermined distance and manage a password for a Wi-Fi connection.

The smartphone key may referred to as a digital key which is installed in a smartphone configured to be able to communicate with a vehicle via ultra-wideband (UWB) wireless communication, Bluetooth Low Energy (BLE) communication, or NFC.

The modules described herein may each be implemented with a memory in which a program for performing a corresponding function is stored and a processor configured to execute the program, and respective memories of the modules may be integrated into at least one memory, and respective processors of the modules may be integrated into at least one processor.

The operational relationship between the digital key 10 and the BDC 20 in the registered user-specific Wi-Fi password setting system configured as described above will be further described below in connection with a process of entering the vehicle and starting the vehicle.

First, when the smartphone is used as the digital key 10, a request for door unlock may be made using an application (app) on the smartphone registered as a user (for example, in this case, using data communication such as long-term evolution (LTE) communication or fifth-generation (5G) communication rather than using Wi-Fi), and in response to the request, the BDC 20 may authenticate a valid user through a digital key user authentication module 21 to unlock the doors. When the smartphone is placed on a wireless smartphone charger, the BDC 20 may allow the vehicle to start through NFC communication.

As described above, when registering the user of the smartphone, settings may be made to identify a driver of the vehicle, and in the case of the card key, it may be set to be used only for a specific purpose (e.g., valet parking, etc.). That is, such an NFC entry/start function may be used in conjunction with a video recording control function, allowing a function including a video recording condition and the like to be selected.

Hereinafter, the registered user-specific Wi-Fi password setting method for an occupant using a digital key will be further described with reference to FIG. 2.

When it is determined that there is an occupant using at least one digital key in step S101, step S102 may be performed to determine whether the occupant is a previous registrant based on the digital key. In this case, a method of determining whether the occupant is a previous registrant in step S102 may include acquiring and checking personal information in a process of checking authentication based on the digital key.

When it is determined that the occupant is a previous registrant in step S102, step S103 may be performed to check Wi-Fi passwords previously set by a plurality of registrants individually.

In this case, in step S104, whether there is a Wi-Fi password previously set by the occupant who is determined to be the previous registrant in step S102 may be determined. In this case, when the Wi-Fi password is determined to be present, step S105 may then be performed.

In step S105, a Wi-Fi password currently set and maintained may be changed and set to the Wi-Fi password checked through steps S103 and S104.

Subsequently, in step S106, a Wi-Fi connection to the smartphone of the occupant (or driver) may be performed using the set Wi-Fi password.

Although not shown, through the smartphone on which the Wi-Fi connection is established in step S106, the occupant (or driver) may control a playing and recording function of the video recording device by the smartphone possessed by the occupant and may watch a video being played by the smartphone.

This process may continue until it is determined in step S107 that the occupant (or driver) stops using Wi-Fi.

In contrast, when it is determined in step S104 that the occupant is a previous registrant but its Wi-Fi password is not registered, step S108 may be performed to check whether there is an intention to register the Wi-Fi password. When it is determined that there is the intention to register the Wi-Fi password, step S109 may be performed to newly register and store the Wi-Fi password, and in this case, the previously set and maintained Wi-Fi password may be changed and set to the newly registered Wi-Fi password.

Subsequently, step S106 may be performed.

In addition, when it is determined in step S102 that the occupant is a user who is able to unlock the doors of the vehicle and start the vehicle using the digital key but is not a previous registrant, step S110 may be performed to register the user based on a digital key of the new user and store personal information, and step S108 may then be performed to perform the process described above.

Therefore, varying a Wi-Fi password for accessing the video recording device for occupants identified through personalization by car-sharing and the like, without a need to reset a Wi-Fi password one by one every time a user changes, may improve the convenience.

Additionally, although not shown in FIG. 2, when using a Wi-Fi tethering function within the vehicle (here, the vehicle acts as an AP in an AVN system and the like), a Wi-Fi password may be automatically reset, providing convenience.

While desirable embodiments of the present disclosure have been shown and described above, it will be apparent to one of ordinary skill in the art that various modifications or changes in form and details may be made in these embodiments without departing from the spirit and scope of the claims and their equivalents.

What is claimed is:

1. A method of setting a password in a vehicle, the method comprising:

obtaining, by a controller of the vehicle, personal information of an occupant of the vehicle based on a digital key that has been used to access the vehicle;

checking, by the controller of the vehicle, a preset Wi-Fi password corresponding to the personal information, the preset Wi-Fi password being stored in association with the personal information; and controlling, by the controller of the vehicle, a Wi-Fi management module of the vehicle to change and set a Wi-Fi password in the vehicle to the preset Wi-Fi password.

2. The method of claim 1, wherein the digital key comprises a smartphone key.

3. The method of claim 1, wherein the digital key is a new digital key that has not been used before, and wherein the personal information of the occupant is newly registered and stored with the new digital key.

4. The method of claim 3, wherein the personal information comprises authentication information.

5. The method of claim 1, wherein controlling the Wi-Fi management module comprises:

failing to find the preset Wi-Fi password, and setting the preset Wi-Fi password by the occupant through a user interface.

6. The method of claim 1, further comprising establishing, by the Wi-Fi management module, a Wi-Fi connection to a smartphone of the occupant using the set Wi-Fi password.

7. The method of claim 6, further comprising performing, by the controller, control of a video recording device in response to a request received from the smartphone of the occupant through the Wi-Fi connection.

8. The method of claim 1, further comprising performing a Wi-Fi tethering function in the vehicle using the set Wi-Fi password.

9. The method of claim 1, wherein the digital key comprises a near-field communication (NFC) card key.

10. The method of claim 1, further comprising connecting a smartphone of the occupant to the vehicle.

11. The method of claim 10, wherein the occupant is a driver of the vehicle.

12. The method of claim 1, wherein the occupant is a driver of the vehicle.

13. A method comprising:

obtaining, by a controller of a vehicle, personal information of a driver of the vehicle based on a digital key;

retrieving, by the controller of the vehicle, a preset Wi-Fi password from a memory of the vehicle, the preset Wi-Fi password corresponding to the personal information;

controlling, by the controller of the vehicle, a Wi-Fi management module of the vehicle to change and set a Wi-Fi password in the vehicle to the preset Wi-Fi password; and establishing, by the Wi-Fi management module, a Wi-Fi connection to a smartphone of the driver using the set Wi-Fi password.

14. The method of claim 13, further comprising, before obtaining the personal information of the driver, unlocking the vehicle with the digital key.

15. The method of claim 13, further comprising, before obtaining the personal information of the driver, starting the vehicle with the digital key.

16. The method of claim 13, wherein the digital key comprises a smartphone key.

17. The method of claim 13, wherein the digital key comprises a near-field communication (NFC) card key.

18. The method of claim 13, further comprising:

after unlocking the vehicle with the digital key;

failing to find the preset Wi-Fi password; and setting the preset Wi-Fi password by the driver through a user interface.

19. The method of claim 18, wherein the user interface is an AVN user interface or a smartphone user interface.

20. The method of claim 13, wherein the personal information comprises authentication information.

* * * * *